(12) United States Patent
Gehring et al.

(10) Patent No.: US 7,746,922 B2
(45) Date of Patent: Jun. 29, 2010

(54) APPARATUS AND METHOD FOR FREQUENCY CALIBRATION BETWEEN TWO RADIOS

(75) Inventors: Mark R. Gehring, Portland, OR (US); David Wright, San Diego, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 971 days.

(21) Appl. No.: 11/297,505

(22) Filed: Dec. 7, 2005

(65) Prior Publication Data

US 2007/0127562 A1 Jun. 7, 2007

(51) Int. Cl.
*H04Q 1/20* (2006.01)
(52) U.S. Cl. .................................................. 375/226
(58) Field of Classification Search ......... 375/224–228; 370/516, 247, 251; 702/69, 120, 121; 348/497; 324/513, 523, 527, 528, 750, 755, 763, 765; 379/21, 26.02, 27.04; 700/39, 81; 714/30, 714/36, 715, 734, 738
See application file for complete search history.

(56) References Cited

U.S. PATENT DOCUMENTS

| | | | |
|---|---|---|---|
| 5,260,671 A | 11/1993 | Iso et al. |
| 5,745,523 A | 4/1998 | Dent et al. |
| 5,748,621 A | 5/1998 | Masuda et al. |
| 5,898,903 A * | 4/1999 | Hu et al. ................. 455/20 |
| 6,052,036 A | 4/2000 | Enstrom et al. |
| 6,058,291 A | 5/2000 | Ketcham |
| 6,072,842 A | 6/2000 | Janesch et al. |
| 6,081,700 A | 6/2000 | Salvi et al. |
| 6,108,525 A | 8/2000 | Takemura |
| 6,128,468 A | 10/2000 | Wyrwas |
| 6,215,295 B1 | 4/2001 | Smith, III |
| 6,337,604 B1 | 1/2002 | Clarke |
| 6,377,640 B2 | 4/2002 | Trans |
| 6,522,696 B1 | 2/2003 | Mobin et al. |
| 6,559,731 B2 | 5/2003 | Jakobsson |
| 6,647,276 B1 | 11/2003 | Kuwahara et al. |
| 6,668,025 B1 | 12/2003 | Sumi et al. |
| 6,882,831 B2 | 4/2005 | Shi et al. |
| 6,933,788 B2 | 8/2005 | Forrester |
| 6,952,124 B2 | 10/2005 | Pham |
| 7,031,676 B2 | 4/2006 | Shi |
| 7,066,643 B2 | 6/2006 | Lee et al. |
| 7,098,749 B2 | 8/2006 | Forrester |
| 7,113,744 B1 | 9/2006 | Moloudi et al. |

(Continued)

OTHER PUBLICATIONS

Pratt, William H., "A Direct Quadrature Modulator IC for 0.9 to 2.5 GHz Wireless Systems", RF Design, 5 pages, Aug. 1994.

(Continued)

*Primary Examiner*—Sam K Ahn

(57) ABSTRACT

Wireless devices transmit and receive radio signals based upon reference frequencies generated by crystal oscillators. If the reference frequencies of the transmitter and the receiver are different, the radio signals may not be received properly or may not be received at all. A measurement circuit measures the amount of error or signal corruption in the radio signals due to the reference frequency offset between the transmitter and the receiver. A frequency offset circuit generates an offset operating frequency in the transmitter or the receiver to align or calibrate the operating frequencies of the devices.

19 Claims, 4 Drawing Sheets

U.S. PATENT DOCUMENTS

| | | | |
|---|---|---|---|
| 7,155,189 | B2 | 12/2006 | Zumkeller et al. |
| 7,254,755 | B2 | 8/2007 | de Obaldia et al. |
| 7,269,394 | B2 * | 9/2007 | Fei et al. .................. 455/91 |
| 7,272,178 | B2 | 9/2007 | Rahman et al. |
| 7,359,448 | B2 | 4/2008 | King et al. |
| 2003/0144020 | A1 * | 7/2003 | Challa et al. ............ 455/522 |
| 2004/0146098 | A1 | 7/2004 | Eliezer et al. |
| 2005/0085249 | A1 * | 4/2005 | Goldstein et al. ........ 455/502 |
| 2005/0169357 | A1 | 8/2005 | Sedarat |
| 2006/0104254 | A1 * | 5/2006 | Shin et al. ................ 370/343 |

OTHER PUBLICATIONS

University of Saint Andrews, "Broadcasting and Communications 16.1 The Crowded Party," 9 pages, Copyright 1995-2006.

Wenzel Associates Inc., "Tuning Range", http://www.wenzel.com/documents/tuning.html, 5 pages, Copyright 1995-2006.

Hewlett Packard, "Digital Modulation in Communications Systems—An Introduction—Application Note 1298," 47 pages, 1997.

Cypress Semiconductor Corporation, "WirelessUSB LS Theory of Operation", 4 pages, Revision Aug. 19, 2003.

Zolomy, Attila, et al., "Antenna Tuning Technique Cuts Size, Cost in ISM Designs", Integration Associates, 7 pgs, Jan. 30, 2004.

Zoka, Gabor, "Refined I/Q Imbalance Measurements", Microwaves & RF, http://www.mwrf.com/Articles/Print.cfm?ArticleID=8318, 8 pages, Jun. 2004.

Cypress Semiconductor Corporation, "WirelessUSB Crystal Guidelines", 2 pages, Revision Mar. 30, 2005.

Aeroflex Corporation, "Application Note: An Introduction to Digital and Vector Modulation", Part No. 46891/863, Issue 2, Aug. 2005, 10 pages.

The International Bureau of WIPO, Written Opinion of the International Searching Authority, Masashi Honda, Nov. 20, 2007, 4 pgs.

International Search Report of the International Searching Authority for International Application No. PCT/US06/61658 mailed Nov. 20, 2007, 2 pages.

USPTO Non-Final Rejection for U.S. Appl. No. 11/006,908 dated May 27, 2009; 12 pages.

USPTO Non-Final Rejection for U.S. Appl. No. 11/006,998 dated Nov. 25, 2008; 14 pages.

USPTO Final Rejection for U.S. Appl. No. 11/006,998 dated Jun. 2, 2008; 17 pages.

USPTO Non-Final Rejection for U.S. Appl. No. 11/006,998 dated Dec. 14, 2007; 17 pages.

USPTO Non-Final Rejection for U.S. Appl. No. 11/006,998 dated Jun. 21, 2007; 12 pages.

* cited by examiner

APPARATUS AND METHOD FOR FREQUENCY CALIBRATION BETWEEN TWO RADIOS

TECHNICAL FIELD

The present invention relates generally to electronic circuits and in particular to circuits used for data communications.

BACKGROUND OF THE INVENTION

Conventional short range data radios typically divide the radio spectrum within which they operate into non-overlapping frequency channels. For example, radios with a 1 Megahertz (MHz) occupied bandwidth operating in the 2.4 Gigahertz (GHz) Industrial Scientific Medical (ISM) band typically divide that spectrum into approximately 80 1-MHz wide channels. These radio systems transmit and receive data using frequency modulated Radio Frequency (RF) signals centered on one of these 1-MHz channels. In some cases, the transmitter may hop between channels during normal data transmission. In other cases, having found a good channel, the transmitter may continue to use that one channel unless or until data transfer on that channel becomes unreliable.

Typically, these radio systems generate the RF carrier frequency by multiplying the frequency of a low frequency crystal oscillator up to the RF frequency used for transmission. Many 2.4 GHz radio systems use 13 MHz crystals for this purpose, but crystal frequencies in the 12-32 MHz range are also common.

Radio receivers, especially Frequency Modulation (FM) receivers using a low Intermediate Frequency (IF), typically implement a Band Pass Filter (BPF), through which the mixed-down signal is passed before demodulation. This is necessary in order to prevent RF signals on adjacent channels from being demodulated or interfering with the reception of signals on the channel the receiver is currently configured to receive.

The crystal oscillators of both the transmitter and receiver should be oscillating at almost exactly the same frequency. If not, part of the transmitted signal may be attenuated by the receiver's BPF. Frequency response 12 in FIG. 1A shows the frequency spectrum of a transmit signal 18 and the frequency operation of a receiver's Band Pass Filter (BPF) 16. When the transmitter and receiver have crystal oscillators with the same frequency, the transmit signal 18 should be substantially centered within the BPF 16. In this common reference frequency condition, the transmitted signal 18 will have minimum attenuation.

Frequency response 14 in FIG. 1B shows the frequency spectrum when the transmitter and receiver have crystal oscillators with different (offset) reference frequencies. In this offset frequency situation, the transmit signal 18 is no longer centered within the BPF 16. Any portion of the transmit signal 18 extending outside of BPF 16 is attenuated, such as the shaded portion 20. The attenuation 20 lowers the signal strength of signal 18 and can prevent the receiver from successfully or reliably receiving data carried in the transmit signal 18.

In one example, a radio system may operate at 2.4 GHz, with a 1 MHz channel spacing and a 900 kHz occupied bandwidth. At 2450 MHz, a 50 parts per million (ppm) offset is equal to 122.5 kHz. As the occupied bandwidth is 100 kHz less than the channel spacing, there is 50 kHz on either side of a perfectly centered transmitter spectrum that is not part of the adjacent channel. In the 50 ppm offset example, 7.2% of the transmitted signal extends into the adjacent channel. Typically, the receiver BPF is a little wider than the channel, and the roll-off of the filter is not a "brick wall", so a small offset can be tolerated with minimal impact on receive sensitivity. In a typical 2.4 GHz radio system, a 50 ppm offset is approximately the maximum that can be tolerated without significantly impacting performance.

Conventional wireless solutions use quartz crystals to derive a radio carrier reference frequency. These conventional solutions have disadvantages, including requiring expensive, high accuracy crystals. Even using such crystals, significant offsets may exist between the transmit and receive frequencies resulting in reduced receive sensitivity. Moderately affordable crystals may require time-of-manufacture crystal trimming, thereby increasing manufacturing cost and complexity.

The receiver and transmitter are each subject to separate oscillator frequency inaccuracies. Therefore, the receiver and transmitter require a crystal with an accuracy of better than ±25 ppm to prevent the oscillator accuracy from impacting system performance with a combined worst case error of greater than 50 ppm.

Crystal oscillator accuracy is typically specified as three components: initial tolerance, temperature variation, and long-term drift. In order to put products in the best possible light, crystal oscillator vendors typically quote only the initial tolerance. Frequency variation with temperature is usually similar to the initial tolerance, and aging is usually in the range of one to five ppm per year.

Crystals generally drift in the same direction. Two instances of the same crystal would not usually drift in opposite directions, but they may well drift at different rates in the same direction. One factor affecting drift is the drive strength of the oscillator circuit driving the crystal. Another factor may be the proportion of time that the crystal oscillator is active. Over 5 years, a crystal with a 3 ppm/year drift spec may drift only 5 ppm (or less) or not at all, while another may drift 15 ppm. This crystal drift depends on drive strength, the amount of time that the oscillator is running, and the physical properties of the individual crystal.

The frequency variation with temperature is not linear, but rather typically a quadratic or cubic curve. Therefore, variations in temperature across only part of the rated range may cause frequency to vary over most of the stated tolerance.

Therefore, a 25 ppm crystal, which initially may appear to be suitable for uses in the wireless applications discussed above, may not in fact be suitable. Such a crystal would typically have 25 ppm initial tolerance, 25 ppm variation over temperature, and 3 ppm/year drift. One such crystal, starting at −25 ppm, and operated at a temperature which caused the frequency to oscillate at close to its minimum frequency, may be oscillating at −50 ppm from its nominal after 5 years. Another crystal, starting at +25 ppm, at a different temperature may oscillate at +65 ppm from its nominal after 5 years, resulting in a difference of 115 ppm. This drift could severely impact the receive sensitivity of almost any 2.4 GHz radio system. Therefore, to meet the ±25 ppm specification discussed above, a more expensive 10 ppm crystal is required.

Above 30 ppm, the cost savings from specifying a looser tolerance is low. For example, one vendor may offer a 13 MHz 30 ppm crystal in volume at a given price, and the 50 ppm version of the same crystal may only be a few cents cheaper. However, crystals with tolerances below 30 ppm quickly become more expensive, and a 10 ppm crystal may typically cost 3× to 5× more than the 30 ppm crystal. Frequency accuracy requirements of a design may therefore place a significant cost burden on low cost wireless systems.

For this reason, many low cost radio Integrated Circuits (ICs) include a feature allowing trimming of the initial crystal frequency. Typically, this is implemented by using a digitally trimmable capacitance. At manufacturing test of a wireless product, the oscillator frequency is measured, and an appropriate trim factor is stored in non-volatile memory within the device. This trim factor is loaded into a radio Integrated Circuit (IC) after each reset and allows the digitally controlled capacitance of the crystal oscillator to tune the crystal frequency to a nominal value. This removes the initial tolerance component of the oscillator, reducing the variation to just the temperature and drift components. This technique allows the use of 15 ppm crystals with many 2.4 GHz radio ICs, without impacting radio performance. However, this comes at the cost and trouble of implementing crystal tuning during manufacture.

It would be desirable to use much less accurate crystals in low cost radio transmitters and receivers without the need of a factory calibration or memory to store said calibration. It would also be desirable to compensate for reference frequency offsets between transmitters and receivers due to variables such as temperature and power supply voltage.

SUMMARY OF THE INVENTION

Wireless devices transmit and receive radio signals based upon reference frequencies that are generated by crystal oscillators. If the reference frequencies of the transmitter and the receiver are different, the radio signals may not be received properly or may not be received at all. To align the frequencies of the transmitter and the receiver, a frequency offset circuit offsets the operating frequency of one of the devices according to the reception quality of the signals. A programmable constant added to the instantaneous frequency of the RF signal inputted to an accumulator creates a frequency offset and varies the operating frequency of the transmitter or the receiver. To align the frequencies of the radios, a first coarse acquisition is made at several different frequency offsets until communications is established between the transmitter and receiver. Feedback from the receiver indicates the frequency error. In one embodiment, a first offset transmit frequency may be generated by adjusting the operating frequency back and forth from one direction to an opposite direction until the bit error rate (BER) is low. A second offset transmit frequency may then be generated by adjusting the first offset transmit frequency back and forth from one direction to an opposite direction until the BER is high. A frequency value between the first and second offset transmit frequencies may then be used as the optimum offset transmit frequency. Thus, the operating frequencies of the transmitter and the receiver are aligned.

DETAILED DESCRIPTION

Figure 2:
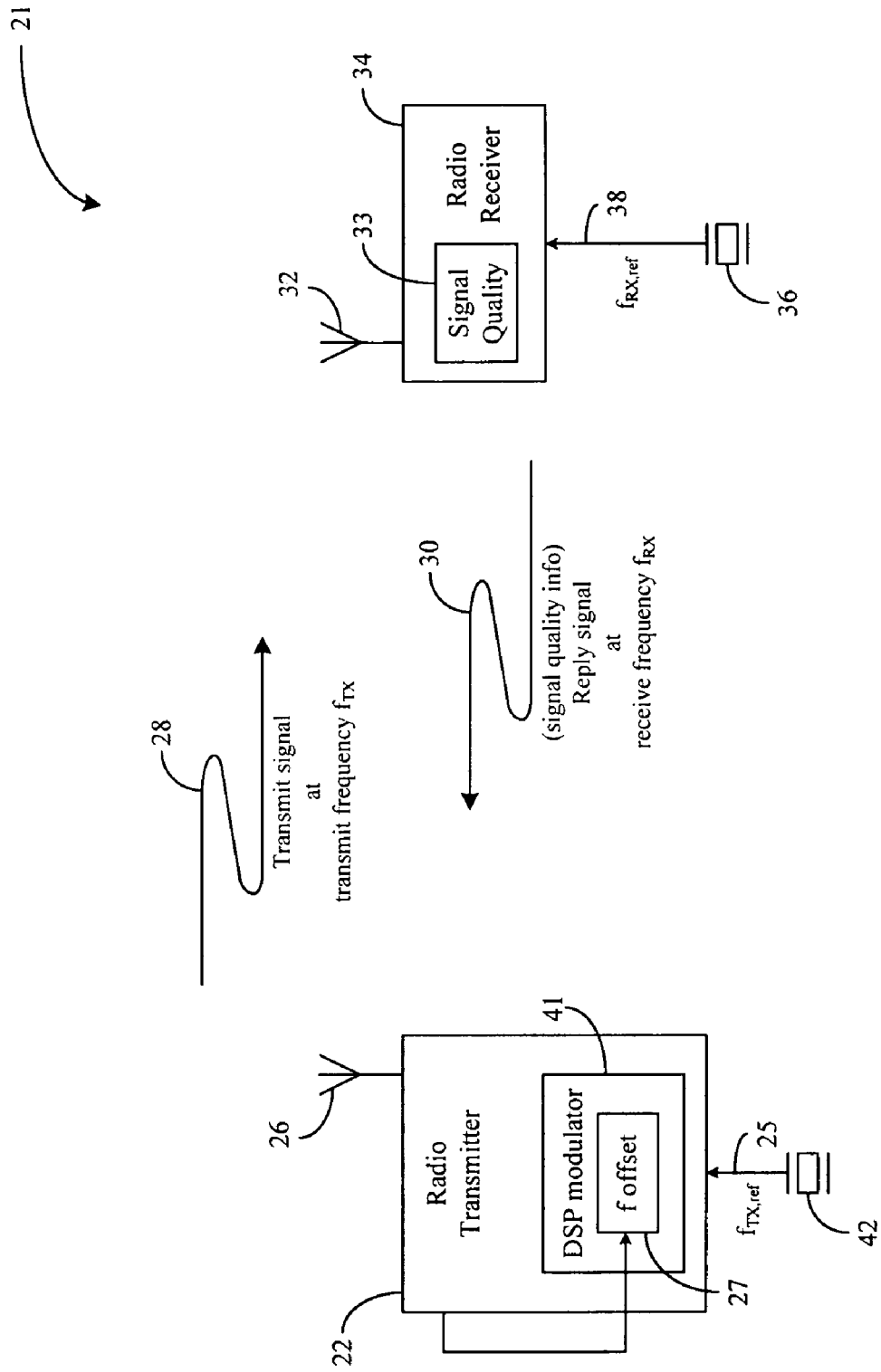
FIG. 2 shows an exemplary implementation of a system for frequency calibration between two radios.

FIG. 2 shows a frequency calibration system 21 that calibrates the operating receive frequency $f_{RX}$ of a radio receiver 34 with the operating transmit frequency $f_{TX}$ of a radio transmitter 22. Crystal oscillators 42, 36 generate transmitter reference frequency $f_{TX,ref}$ 25 and receiver reference frequency $f_{RX,ref}$ 38, respectively. The radio transmitter 22 includes an antenna 26 that transmits signals 28 at the operating transmit frequency $f_{TX}$ that are received by the antenna 32 of receiver 34. In one embodiment, the radio receiver 34 calculates signal quality information 33 associated with the received signal 28. Signal quality information 33 can be any signal measurement or statistic that indicates the transmitter 22 and the receiver 34 have offset reference frequencies. The signal quality information 33 may be a Bit Error Rate (BER), packet error rate, signal strength, or any other indicator of frequency offset. Calculating these signal quality measurements have been used for other purposes in the past and, therefore, are known to those skilled in the art and not described in further detail.

In one embodiment, the receiver 34 may send the signal quality information 33 back to the transmitter 22 in reply signal 30. Based on the signal quality information in reply signal 30, the transmitter 22 then creates a desired frequency offset 27 to vary the operating transmit frequency $f_{TX}$ of transmit signals 28 by offsetting the transmitter reference frequency $f_{TX,ref}$ 25. In another embodiment, the receiver reference frequency $f_{Rx,ref}$ 38 can be offsetted, instead, and, thus vary the operating receive frequency $f_{RX}$.

It is not essential that the transmitter 22 and receiver 34 operate exactly on a pre-determined nominal frequency. For example, the transmitter 22 and receiver 34 may be designed to operate at a nominal frequency of 2450 MHz. The radios can work equally as well if both are centered at 2450.1 MHz. There may be a slight reduction in immunity to adjacent channel signals, but in general, the sloped (as opposed to brickwall) roll-off of the receiver BPF means that wireless systems typically try to avoid using adjacent channels between two pairs of closely located devices.

Figure 3:
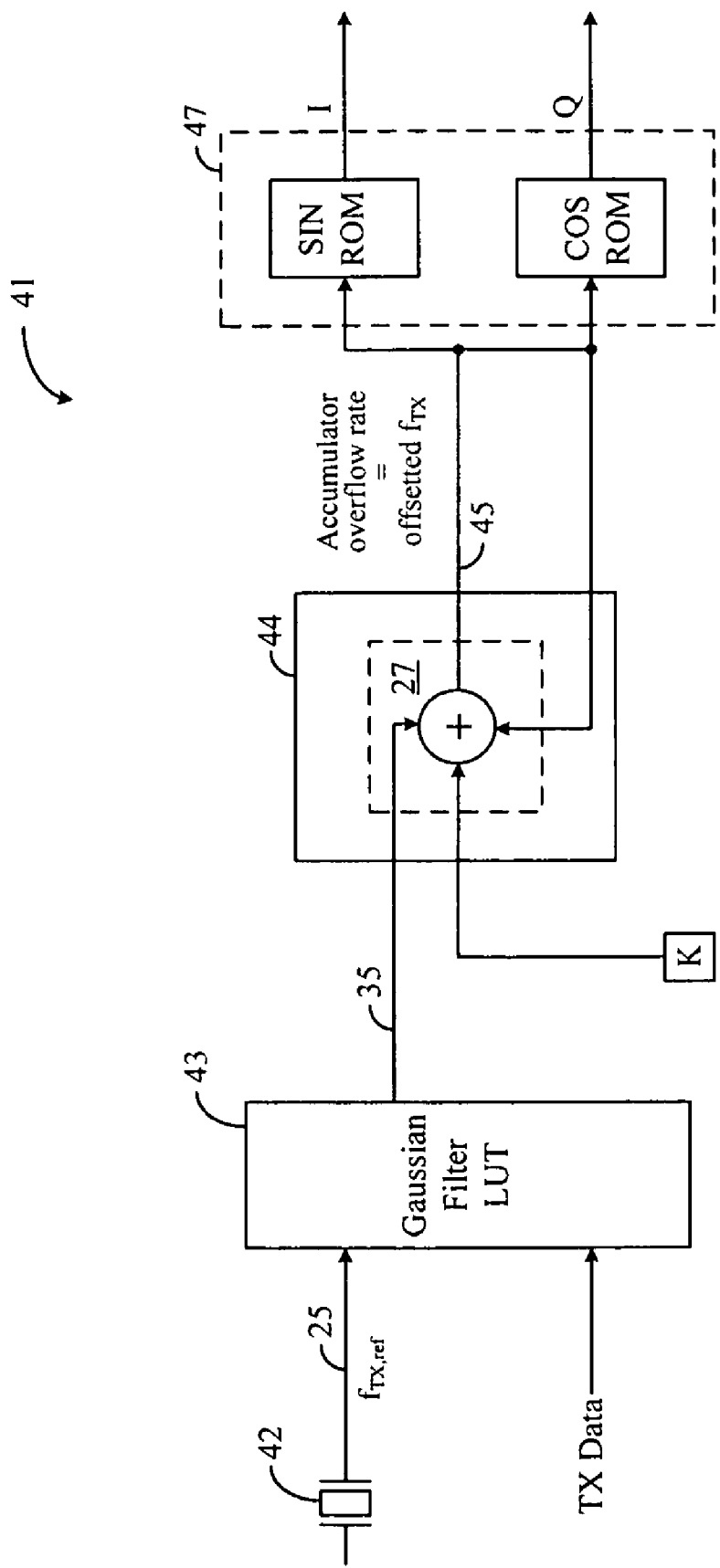
FIG. 3 shows one embodiment of a transmitter modulator DSP for creating a frequency offset.

FIG. 3 shows in more detail an example of a modulator digital signal processor (DSP) 41 for creating a frequency offset 27 in the transmitter 22. The reference frequency $f_{RX,ref}$ 25 for the radio transmitter 22 (FIG. 2) is generated by a crystal oscillator 42 and inputted to a Gaussian filter Lookup Table (LUT) 43 for pulse shaping. The output 35 of the Gaussian filter LUT 43, which represents the instantaneous frequency of the RF signal, is inputted to an accumulator 44. To create the desired frequency offset 27 and vary the operating transmit frequency $f_{TX}$ of the transmitter 22, a programmable constant K is added to the instantaneous frequency 35 in the accumulator 44. The output 45 of the accumulator 44 represents the instantaneous phase of the signal and is sent to a SIN/COS lookup table 47. The rate of overflow of the accumulator 44 determines the offsetted operating transmit frequency $f_{TX,offsetted}$ of the transmitter 22. Thus, the offsetted operating transmit frequency $f_{TX,offsetted}$ is determined by the size of the accumulator 44. For example, with a 12 MHz clock and a 14-bit accumulator, the accumulator 44 will overflow at a rate of $$f_{TX,offsetted} = 12 \text{ MHz} * (f \text{ offset}) = 12 \text{ MHz} * K/(2^{14}),$$

where K is the programmable constant added to accumulator on each 12 MHz clock edge to offset the reference frequency $f_{TX,ref}$.

For example, if the constant K=1365, then the offsetted operating transmit frequency $f_{TX,offsetted}$ will be 999755 Hz, or about 1 MHz. This also illustrates the resolution of the method. Each increment in the programmable constant K causes a change or offset of 12 MHz/($2^{14}$), or 732 Hz. Thus, in the context of a 2.4 GHz transmitter, for example, 732 Hz equates to a 0.3 ppm offset.

Figure 1B:
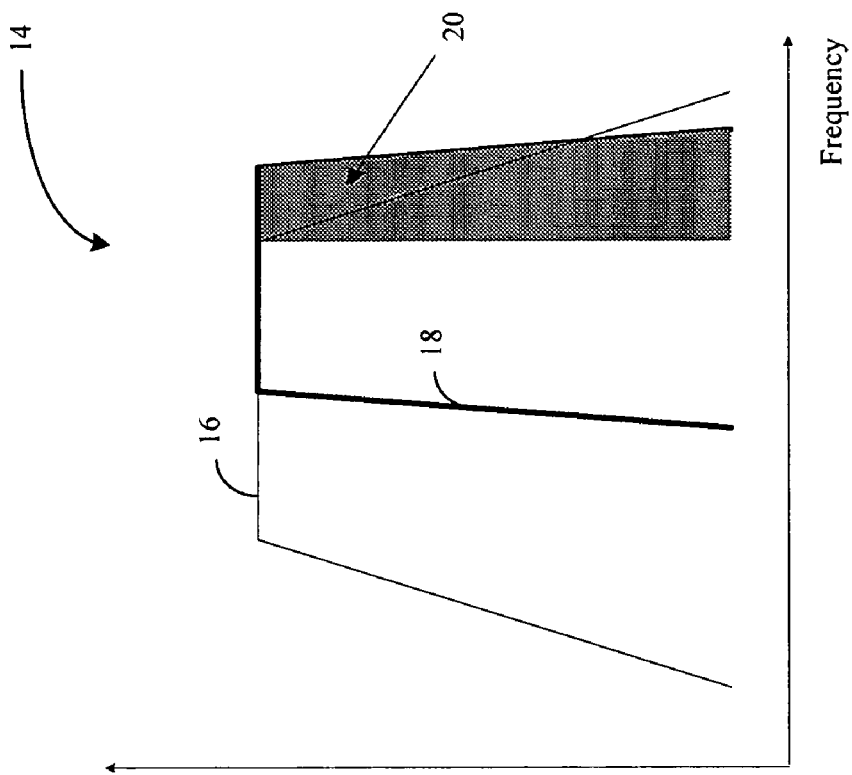
FIG. 1B shows attenuation of a transmitted signal when the transmitter and receiver reference frequencies are offset.
Figure 1A:
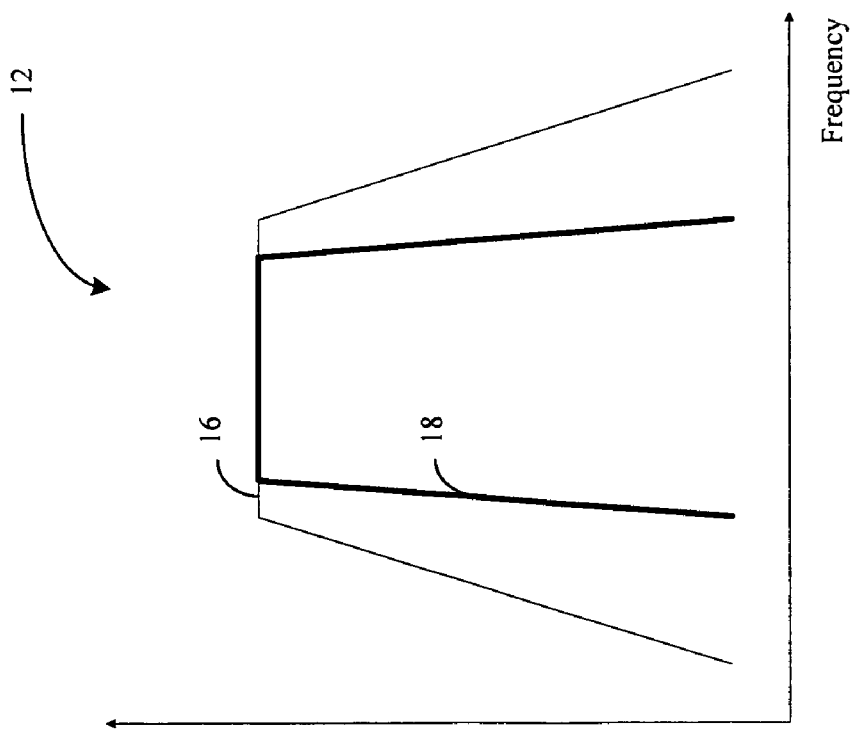
FIG. 1A shows the frequency response of a transmitted signal when the transmitter and receiver have crystal oscillators with the same frequency.
Figure 4:
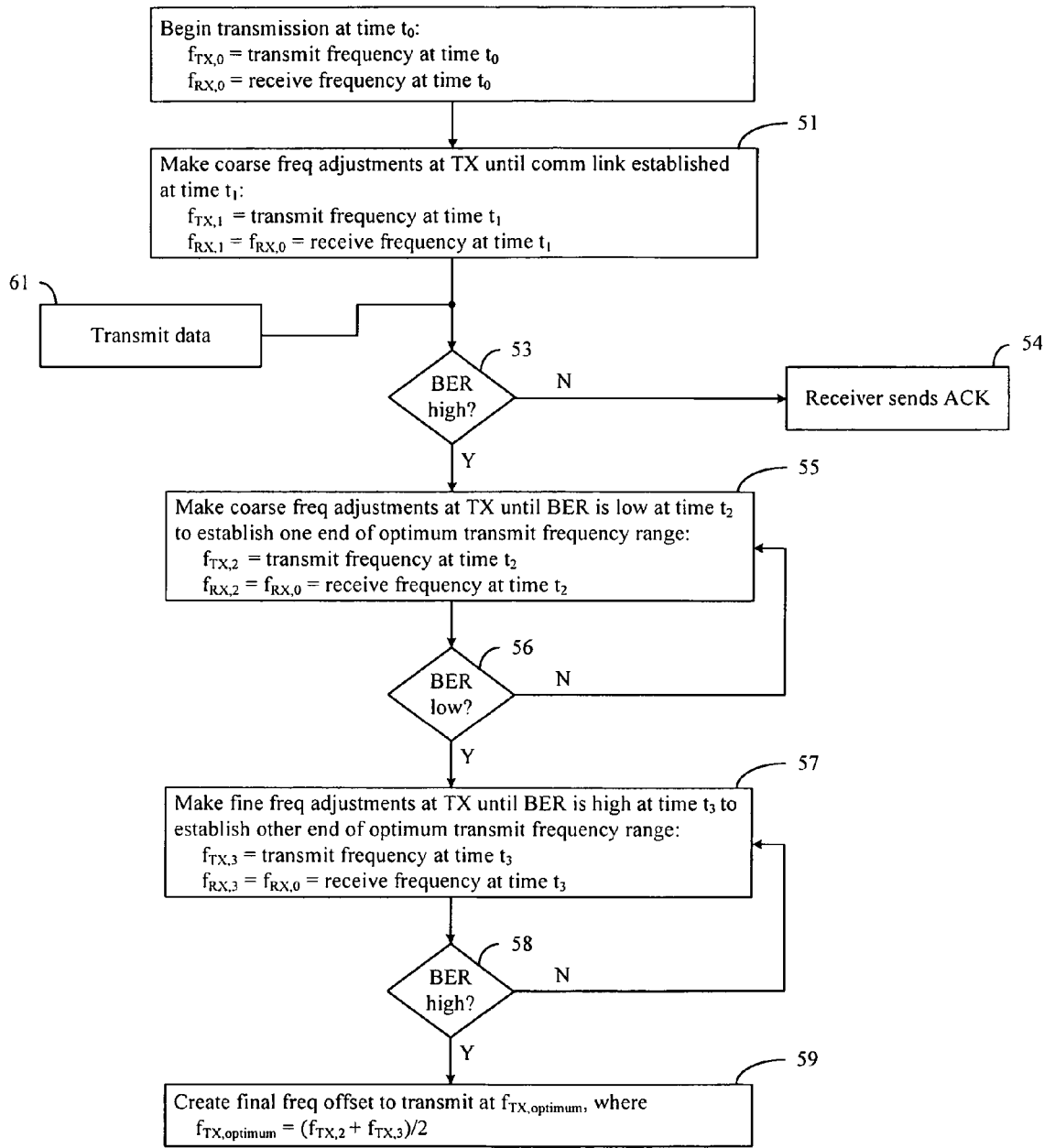
FIG. 4 shows a method of using the transmitter modulator DSP of FIG. 3 to calibrate the frequencies of two radios.

FIG. 4 illustrates how a frequency offset 27 may be created in the transmitter 22 (FIG. 2) and used to calibrate the operating frequencies between two radios. As shown in block 50, at the start of radio operation, transmitter 22 may begin operating at transmit frequency $f_{TX,0}$ and receiver 34 may begin operating at receive frequency $f_{RX,0}$. In block 51, a first coarse acquisition is made at several different frequency offsets in both directions (i.e., sweep across a frequency range) until a communications link is established. That is, a successive approximation method may first be used to bring the initial operating transmit frequency $f_{TX,0}$ of the transmitter 22 close to the initial operating receive frequency $f_{RX,0}$ in the receiver 34. If the transmitter and receiver frequencies are significantly offset, even by one or two hundred ppm, the receiver 34 will not completely fail to receive the transmitted signal 28 and the communications link can still be established. As shown in block 51, the transmitter 22 may be operating at transmit frequency $f_{TX,1}$ when the communications link is established at time $t_1$. However, the BER on the communications link will be very high. Although this will often make it difficult for the receiver 34 to successfully receive significant quantities of transmitted data, the receiver 34 will still be aware that the signal 28 is being transmitted. Sufficient data will get though so that the receiver 34 will be able to recognize the transmitter 22 as its counterpart, rather than an interfering signal. A high BER in block 53 may be represented by frequency response 14 in FIG. 1B illustrating the transmit signal offset from the expected frequency response of the Band Pass Filter (BPF) of the receiver.

Referring back to FIG. 4, after establishing a communications link with the high BER in block 53, the operating frequencies of the transmitter 22 and the receiver 34 can now be aligned or calibrated to each other. To transmit at an optimum operating transmit frequency $f_{TX,optimum}$, an optimum operating transmit frequency range is first established. As shown in block 55, coarse frequency adjustments are made in both directions at the transmitter 22 until the BER is low in block 56, establishing one end of the optimum frequency range at $f_{TX,2}$. Next, in block 57, fine frequency adjustments are made in both directions at the transmitter 22 until the BER is high in block 58, establishing the other end of the optimum frequency range at $f_{TX,3}$. The center frequency value between the two ends of the optimum frequency range, $f_{TX,2}$ and $f_{TX,3}$, may then be used as the optimum operating transmit frequency $f_{TX,optimum}$. Thus, in block 59, the modulator DSP 41 (FIG. 3) creates the frequency offset 27 to vary the operating transmit frequency $f_{TX}$ such that the transmit signal 28 (FIG. 2) is at the optimum operating transmit frequency $f_{TX,optimum}$, and the operating frequencies of the transmitter 22 and the receiver 34 are aligned.

The modulator DSP 41 (FIG. 3) can be invoked at any time that an offset exists between the operating frequencies of the receiver 34 and the transmitter 22. Referring again to FIG. 4, in block 61, the transmitter 22 sends data to the receiver 34. The receiver 34 demodulates the received data. If there are sufficiently few bit errors after error correction techniques have corrected the data, then the data may be successfully received in the receiver 34. Accordingly, in block 54, the receiver 34 sends back an acknowledge handshake packet to the transmitter 22 and the transaction completes. However, if the bit error rate in the data is uncorrectable, the receiver 34 will not respond. Having received a corrupted data packet in block 53, the receiver 34 stores a measure of the bit error rate of the corrupted packet. The receiver 34 sends this frequency error information to the transmitter 22. As discussed above, a frequency offset 27 may then be created in the modulator DSP 41 of the transmitter 22 to vary the operating transmit frequency $f_{TX}$ (FIG. 3) so that the operating frequencies of the transmitter 22 and the receiver 34 can be aligned.

In another embodiment, the amount of offset between the transmitter 22 and receiver 34 frequencies may be directly measured in the receiver 34. For example, an analog to digital converter at the output of the FM detector in the receiver 34 can be used to determine the amount of frequency offset. In this case, when the transmit signal 28 generates a low BER, the receiver 34 sends back an acknowledge handshake packet to the transmitter 22 and provides the frequency offset amount. The DSP modulator 41 of the transmitter 22 then varies the operating transmit frequency $f_{TX}$ using the frequency offset amount from the receiver 34.

Use of a transmitter modulator DSP to offset the operating transmit frequency has many advantages, including enabling the use of low cost, large tolerance crystals without the need of a factory calibration or memory to store said calibration. A further advantage is that the transmitter modulator DSP can be invoked at any time to align the frequencies of transmitters and receivers. Due to variations, such as crystal aging, temperature, voltages, etc., the original specified frequency crystal oscillator may change over time.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. We claim all modifications and variation coming within the spirit and scope of the following claims.

We claim:

1. A wireless device, comprising:
   a crystal oscillator configured to generate a reference frequency;
   a radio circuit configured to operate according to the reference frequency; and
   a frequency offset circuit configured to generate, based on signal quality information in a wireless data signal received from a second wireless device, an offset value to reduce an operating frequency offset between the wireless device and the second wireless device, wherein the frequency offset circuit comprises an accumulator circuit, and wherein an overflow rate of the accumulator circuit represents the operating frequency offset of the radio circuit.

2. The wireless device of claim 1, wherein the frequency offset circuit is configured to:
   adjust an operating frequency of the radio circuit in a first direction and measure a signal reception quality;
   repeatedly adjust the operating frequency of the radio circuit further in the first direction when a re-measured signal reception quality improves; and
   adjust the operating frequency in a second direction generally opposite to the first direction when the re-measured signal reception quality gets worse.

3. The wireless device of claim 1, wherein the accumulator circuit is configured to receive an instantaneous frequency of a Radio Frequency (RF) signal at a first input, a programmable constant at a second input, and includes an accumulator circuit output.

4. The wireless device of claim 3, wherein the frequency offset circuit comprises a digital filter configured to sample the reference frequency and output the instantaneous frequency of the RF signal.

5. The wireless device of claim 1, wherein the signal quality information comprises an indicator of the operating frequency offset between the wireless device and the second wireless device.

6. The wireless device of claim 5, wherein the indicator of the operating frequency offset comprises one or more of: a Bit Error Rate (BER), packet error rate, or a signal strength.

7. The wireless device according to claim 1, wherein the wireless radio circuit is a two-way transceiver.

8. A frequency calibration method comprising:
   adjusting a first operating transmit frequency on a transmitting device to establish an operating transmission frequency range for wireless data transmissions between the transmitting device and a receiving device; and
   based on the operating transmission frequency range, generating a second operating transmit frequency for the wireless data transmissions by inputting to an accumulator, a signal representing an instantaneous frequency of the first operating transmit frequency and adjusting an overflow rate from the accumulator to obtain the second operating transmit frequency, wherein the second operating transmit frequency is associated with a reduced amount of carrier-based operating frequency offset between the transmitting device and the receiving device.

9. The method of claim 8, wherein a reference frequency offset between the transmitting and receiving devices is measured in the receiving device.

10. The method of claim 8, wherein the adjusting comprises:
   generating a first transmit frequency by adjusting the first operating transmit frequency back and forth from one direction to an opposite direction until an amount of corruption measured by a Bit Error Rate (BER) is low; and
   generating a second transmit frequency by adjusting the first transmit frequency back and forth from one direction to an opposite direction until the amount of corruption measured by the BER is high.

11. The method of claim 10, wherein the second operating transmit frequency comprises a frequency value centered between the first offset transmit frequency and the second offset transmit frequency.

12. The method of claim 8, wherein an amount of corruption associated with individual wireless data transmissions is determined by measuring at least one of: a received signal strength of an RF transmission or a Bit Error Rate (BER).

13. The method of claim 12, further comprising:
   repeatedly determining an amount of operating frequency offset between the transmitting and receiving devices;
   repeatedly offsetting the first operating transmit frequency of one of the transmitting and receiving devices according to the amount of operating frequency offset; and
   repeatedly recalculating a current amount of corruption in a next data transmission using an offsetted operating frequency.

14. The method of claim 8, wherein the adjusting the first operating transmit frequency and the generating the second operating transmit frequency is initiated in response to reception of data transmissions with a high Bit Error Rate (BER).

15. The method of claim 8, wherein the adjusting the first operating transmit frequency and the generating the second operating transmit frequency is initiated in response to a change in temperature measured at the transmitting device or the receiving device.

16. A radio system, comprising:
   a radio transmitter configured to transmit a radio transmission according to a transmitter crystal oscillator frequency;
   a radio receiver configured to receive and process the radio transmission according to a receiver crystal oscillator frequency;
   a processing element configured to calculate a signal integrity for a received radio transmission; and
   a frequency offset circuit configured to generate an offset carrier-based operating frequency of the radio transmitter according to the calculated signal integrity, wherein the frequency offset circuit comprises an accumulator circuit, and wherein an overflow rate of the accumulator circuit represents the offset carrier-based operating frequency of the radio transmitter.

17. The radio system of claim 16, wherein the processing element is configured to determine the signal integrity according to a Bit Error Rate (BER) for the radio transmission.

18. The radio system of claim 17, wherein the frequency offset circuit is configured to repeatedly generate the offset carrier-based operating frequency in response to the BER until the BER value is within a desired range.

19. The radio system of claim 16, wherein the accumulator circuit is configured to receive a signal at an instantaneous frequency of the transmitter crystal oscillator at a first input, a programmable constant at a second input, and includes an accumulator circuit output.

* * * * *